US008429695B2

(12) United States Patent
Halik et al.

(10) Patent No.: US 8,429,695 B2
(45) Date of Patent: *Apr. 23, 2013

(54) CATV ENTRY ADAPTER AND METHOD UTILIZING DIRECTIONAL COUPLERS FOR MOCA SIGNAL COMMUNICATION

(75) Inventors: Gregory F. Halik, Empire, MI (US); Chad T. Wells, Highlands Ranch, CO (US); John M. Egan, Jr., Franktown, CO (US); Charles F. Newby, Evergreen, CO (US)

(73) Assignee: PPC Broadband, Inc., East Syracuse, NY (US)

( * ) Notice: Subject to any disclaimer, the term of this patent is extended or adjusted under 35 U.S.C. 154(b) by 484 days.

This patent is subject to a terminal disclaimer.

(21) Appl. No.: 12/704,833

(22) Filed: Feb. 12, 2010

(65) Prior Publication Data

US 2010/0146564 A1     Jun. 10, 2010

Related U.S. Application Data

(63) Continuation-in-part of application No. 12/255,008, filed on Oct. 21, 2008.

(51) Int. Cl.
*H04N 7/18* (2006.01)
*H04N 7/173* (2011.01)
*H04N 7/16* (2011.01)

(52) U.S. Cl.
USPC ............ 725/78; 725/79; 725/80; 725/81; 725/82; 725/127; 725/149

(58) Field of Classification Search .............. 725/74, 725/78–82, 119, 127–129, 149
See application file for complete search history.

(56) References Cited

U.S. PATENT DOCUMENTS

| 3,790,909 A | 2/1974 | Le Fevre |
| 3,939,431 A | 2/1976 | Cohlman |
| 4,027,219 A | 5/1977 | Van Alphen et al. |
| 4,306,403 A | 12/1981 | Hubbard et al. |
| 4,344,499 A | 8/1982 | Van der Lely et al. |
| 4,512,033 A | 4/1985 | Schrock |

(Continued)

FOREIGN PATENT DOCUMENTS

| JP | 55080989 A | 6/1980 |
| JP | 55132126 | 10/1980 |

(Continued)

OTHER PUBLICATIONS

U.S. Appl. No. 12/691,149, filed Jan. 21, 2010; Conf. No. 9191; GAU: 2423.

(Continued)

*Primary Examiner* — Kristine Kincaid
*Assistant Examiner* — Gigi L Dubasky
(74) *Attorney, Agent, or Firm* — Schmeiser, Olsen & Watts, LLP.

(57) ABSTRACT

A cable television (CATV) entry adapter connects to a CATV network and serves as a hub in a Multimedia over Coax Alliance (MoCA) network. MoCA signals are communicated between passive and active ports of the entry adapter through a pair of directional couplers which allow a MoCA-enabled embedded multimedia device (eMTA) at the passive port to communicate with multimedia devices of the MoCA network connected to the active ports.

16 Claims, 3 Drawing Sheets

U.S. PATENT DOCUMENTS

| | | |
|---|---|---|
| 4,520,508 A | 5/1985 | Reichert, Jr. |
| 4,648,123 A | 3/1987 | Schrock |
| 4,677,390 A | 6/1987 | Wagner |
| 4,715,012 A | 12/1987 | Mueller, Jr. |
| 4,961,218 A | 10/1990 | Kiko |
| 4,982,440 A | 1/1991 | Dufresne et al. |
| 5,010,399 A | 4/1991 | Goodman et al. |
| 5,126,686 A | 6/1992 | Tam |
| 5,126,840 A | 6/1992 | Dufresne et al. |
| 5,214,505 A | 5/1993 | Rabowsky et al. |
| 5,231,660 A | 7/1993 | West, Jr. |
| 5,369,642 A | 11/1994 | Shioka et al. |
| 5,485,630 A | 1/1996 | Lee et al. |
| 5,548,255 A | 8/1996 | Spielman |
| 5,557,319 A | 9/1996 | Gurusami et al. |
| 5,557,510 A | 9/1996 | McIntyre et al. |
| 5,719,792 A | 2/1998 | Bush |
| 5,740,044 A | 4/1998 | Ehrenhardt et al. |
| 5,745,836 A | 4/1998 | Williams |
| 5,815,794 A | 9/1998 | Williams |
| 5,818,825 A | 10/1998 | Corrigan et al. |
| 5,839,052 A | 11/1998 | Dean et al. |
| 5,893,024 A | 4/1999 | Sanders et al. |
| 5,937,330 A | 8/1999 | Vince et al. |
| 5,950,111 A | 9/1999 | Georger et al. |
| 5,970,053 A | 10/1999 | Schick et al. |
| 6,012,271 A | 1/2000 | Wilkens et al. |
| 6,014,547 A | 1/2000 | Caporizzo et al. |
| 6,049,693 A | 4/2000 | Baran et al. |
| 6,069,960 A | 5/2000 | Mizukami et al. |
| 6,094,211 A | 7/2000 | Baran et al. |
| 6,101,932 A | 8/2000 | Wilkens |
| 6,128,040 A | 10/2000 | Shinbori et al. |
| 6,129,187 A | 10/2000 | Bellanger et al. |
| 6,173,225 B1 | 1/2001 | Stelzle et al. |
| 6,185,432 B1 | 2/2001 | Vembu |
| 6,205,138 B1 | 3/2001 | Nihal et al. |
| 6,229,375 B1 | 5/2001 | Koen |
| 6,348,837 B1 | 2/2002 | Ibelings |
| 6,348,955 B1 | 2/2002 | Tait |
| 6,373,349 B2 | 4/2002 | Gilbert |
| 6,377,316 B1 | 4/2002 | Mycynek et al. |
| 6,388,539 B1 | 5/2002 | Rice |
| 6,425,132 B1 | 7/2002 | Chappell |
| 6,430,904 B1 | 8/2002 | Coers et al. |
| 6,495,998 B1 | 12/2002 | Terreault |
| 6,498,925 B1 | 12/2002 | Tauchi |
| 6,510,152 B1 | 1/2003 | Gerszberg et al. |
| 6,546,705 B2 | 4/2003 | Scarlett et al. |
| 6,550,063 B1 | 4/2003 | Matsuura |
| 6,560,778 B1 | 5/2003 | Hasegawa |
| 6,570,928 B1 | 5/2003 | Shibata |
| 6,587,012 B1 | 7/2003 | Farmer et al. |
| 6,622,304 B1 | 9/2003 | Carhart |
| 6,640,338 B1 | 10/2003 | Shibata |
| 6,678,893 B1 | 1/2004 | Jung |
| 6,683,513 B2 | 1/2004 | Shamsaifar et al. |
| 6,725,462 B1 | 4/2004 | Kaplan |
| 6,728,968 B1 | 4/2004 | Abe et al. |
| 6,757,910 B1 | 6/2004 | Bianu |
| 6,758,292 B2 | 7/2004 | Shoemaker |
| 6,804,828 B1 | 10/2004 | Shibata |
| 6,843,044 B2 | 1/2005 | Clauss |
| 6,845,232 B2 | 1/2005 | Darabi |
| 6,868,552 B1 | 3/2005 | Masuda et al. |
| 6,877,166 B1 | 4/2005 | Roeck et al. |
| 6,915,530 B1 * | 7/2005 | Kauffman et al. ............. 725/125 |
| 6,920,614 B1 | 7/2005 | Schindler et al. |
| 6,928,175 B1 | 8/2005 | Bader et al. |
| 6,942,595 B2 | 9/2005 | Hrazdera |
| 7,003,275 B1 | 2/2006 | Petrovic |
| 7,029,293 B2 | 4/2006 | Shapson et al. |
| 7,039,432 B2 | 5/2006 | Strater et al. |
| 7,048,106 B2 | 5/2006 | Hou |
| 7,127,734 B1 | 10/2006 | Amit |
| 7,162,731 B2 | 1/2007 | Reidhead et al. |
| 7,254,827 B1 | 8/2007 | Terreault |
| 7,283,479 B2 | 10/2007 | Ljungdahl et al. |
| 7,399,255 B1 | 7/2008 | Johnson et al. |
| 7,404,355 B2 | 7/2008 | Viaud et al. |
| 7,416,068 B2 | 8/2008 | Ray et al. |
| 7,454,252 B2 | 11/2008 | El-Sayed |
| 7,464,526 B2 | 12/2008 | Coenen |
| 7,505,819 B2 | 3/2009 | El-Sayed |
| 7,530,091 B2 | 5/2009 | Vaughan |
| 7,675,381 B2 | 3/2010 | Lin |
| 7,742,777 B2 | 6/2010 | Strater et al. |
| 2001/0016950 A1 | 8/2001 | Matsuura |
| 2002/0141347 A1 | 10/2002 | Harp et al. |
| 2002/0144292 A1 | 10/2002 | Uemura et al. |
| 2002/0166124 A1 | 11/2002 | Gurantz et al. |
| 2002/0174423 A1 | 11/2002 | Fifield et al. |
| 2003/0084458 A1 | 5/2003 | Ljungdahl et al. |
| 2004/0147273 A1 | 7/2004 | Morphy |
| 2004/0172659 A1 | 9/2004 | Ljungdahl et al. |
| 2004/0229561 A1 | 11/2004 | Cowley et al. |
| 2005/0034168 A1 | 2/2005 | Beveridge |
| 2005/0047051 A1 | 3/2005 | Marland |
| 2005/0144649 A1 | 6/2005 | Bertonis et al. |
| 2005/0183130 A1 | 8/2005 | Sadja et al. |
| 2005/0283815 A1 | 12/2005 | Brooks et al. |
| 2005/0289632 A1 | 12/2005 | Brooks et al. |
| 2006/0015921 A1 | 1/2006 | Vaughan |
| 2006/0041918 A9 | 2/2006 | Currivan et al. |
| 2006/0191359 A1 | 8/2006 | Tarasinski et al. |
| 2006/0205442 A1 | 9/2006 | Phillips et al. |
| 2006/0241838 A1 | 10/2006 | Mongiardo et al. |
| 2006/0282871 A1 | 12/2006 | Yo |
| 2007/0024393 A1 | 2/2007 | Forse et al. |
| 2007/0288981 A1 | 12/2007 | Mitsuse et al. |
| 2007/0288982 A1 | 12/2007 | Donahue |
| 2008/0001645 A1 | 1/2008 | Kuroki |
| 2008/0022344 A1 | 1/2008 | Riggsby |
| 2008/0040764 A1 | 2/2008 | Weinstein et al. |
| 2008/0120667 A1 | 5/2008 | Zaltsman |
| 2008/0127287 A1 | 5/2008 | Alkan et al. |
| 2008/0168518 A1 | 7/2008 | Hsue et al. |
| 2008/0247401 A1 | 10/2008 | Bhal et al. |
| 2008/0247541 A1 | 10/2008 | Cholas et al. |
| 2008/0271094 A1 * | 10/2008 | Kliger et al. ............. 725/80 |
| 2008/0313691 A1 | 12/2008 | Cholas et al. |
| 2009/0031391 A1 | 1/2009 | Urbanek |
| 2009/0047917 A1 | 2/2009 | Phillips et al. |
| 2009/0077608 A1 | 3/2009 | Romerein et al. |
| 2009/0165070 A1 | 6/2009 | McMullin et al. |
| 2009/0180782 A1 * | 7/2009 | Bernard et al. ............. 398/140 |
| 2009/0320086 A1 | 12/2009 | Rijssemus et al. |
| 2010/0017842 A1 | 1/2010 | Wells |
| 2010/0095344 A1 | 4/2010 | Newby et al. |
| 2010/0125877 A1 | 5/2010 | Wells et al. |
| 2010/0194489 A1 | 8/2010 | Kearns et al. |
| 2010/0225813 A1 | 9/2010 | Hirono et al. |
| 2011/0051014 A1 | 3/2011 | Wang et al. |
| 2011/0069740 A1 | 3/2011 | Cowley et al. |
| 2011/0072472 A1 | 3/2011 | Wells et al. |
| 2012/0054805 A1 | 3/2012 | Shafer et al. |
| 2012/0054819 A1 | 3/2012 | Alkan et al. |

FOREIGN PATENT DOCUMENTS

| | | |
|---|---|---|
| JP | 55132126 A | 10/1980 |
| JP | 57091055 | 6/1982 |
| JP | 57091055 A | 6/1982 |
| JP | 58101582 U | 6/1983 |
| JP | 58-99913 | 7/1983 |
| JP | 05899913 | 7/1983 |
| JP | 59026709 | 8/1984 |
| JP | 61157035 | 7/1986 |
| JP | 61157035 A | 7/1986 |
| JP | 05191416 A | 7/1993 |
| JP | 07038580 A | 2/1995 |
| JP | 11069334 | 3/1999 |
| JP | 11069334 A | 3/1999 |
| JP | 2001177580 | 6/2001 |
| JP | 2004080483 A | 3/2004 |
| JP | 2005005875 A | 1/2005 |
| JP | 2007166109 A | 6/2007 |
| JP | 2007166110 A | 6/2007 |

| | | | |
|---|---|---|---|
| WO | WO-0024124 A1 | 4/2000 |
| WO | WO-0172005 A1 | 9/2001 |
| WO | WO-0233969 A1 | 4/2002 |
| WO | WO-02091676 A1 | 11/2002 |

OTHER PUBLICATIONS

PCT/US2010/049568 International Search Report May 31, 2011.
Office Action (Mail Date: Jan. 23, 2012 for U.S. Appl. No. 12/250,229, filed Oct. 13, 2008.

U.S. Appl. No. 13/167,497, filed Jun. 23, 2011.
U.S. Appl. No. 13/245,510, filed Sep. 26, 2011.
U.S. Appl. No. 13/333,060, filed Dec. 21, 2011.
Office Action {Mail Date: Nov. 22, 2011 for U.S. Appl. No. 12/255,008, filed Oct. 21, 2008.

* cited by examiner

CATV ENTRY ADAPTER AND METHOD UTILIZING DIRECTIONAL COUPLERS FOR MOCA SIGNAL COMMUNICATION

CROSS REFERENCE TO RELATED APPLICATION

This is a continuation in part of the invention described in U.S. patent application Ser. No. 12/255,008, filed Oct. 21, 2008 by some of the same inventors herein, titled Multi-Port Entry Adapter, Hub and Method for Interfacing a CATV Network and a MoCA Network. The invention described in U.S. patent application Ser. No. 12/255,008 is assigned to the assignee hereof.

FIELD OF THE INVENTION

This invention relates to community access television or cable television (CATV) networks and to Multimedia over Coax Alliance (MoCA) in-home entertainment networks. More particularly, the present invention relates to a new and improved CATV entry adapter which conducts active CATV signals to active ports, conducts passive CATV signals to passive ports, and which uses directional couplers to conduct MoCA signals between the passive and active ports, among other improvements.

BACKGROUND OF THE INVENTION

CATV networks use an infrastructure of interconnected coaxial cables, signal splitters and combiners, repeating amplifiers, filters, trunk lines, cable taps, drop lines and other signal-conducting devices to supply and distribute high frequency "downstream" signals from a main signal distribution facility, known as a "headend," to the premises (homes and offices) of CATV subscribers. The downstream signals operate the subscriber equipment, such as television sets, telephone sets and computers. In addition, most CATV networks also transmit "upstream" signals from the subscriber equipment back to the headend of the CATV network. For example, the subscriber uses a set top box to select programs for display on the television set. As another example, two-way communication is essential when using a personal computer connected through the CATV infrastructure to the public Internet. As a further example, voice over Internet protocol (VOIP) telephone sets use the CATV infrastructure and the public Internet as the communication medium for two-way telephone conversations.

To permit simultaneous communication of upstream and downstream CATV signals, and to permit interoperability of the subscriber equipment and the equipment associated with the CATV network infrastructure outside of subscriber premises, the downstream and upstream signals are confined to two different frequency bands. The downstream frequency band is within the range of 54-1002 megahertz (MHz) and the upstream frequency band is within the range of 5-42 MHz, in most CATV networks.

The downstream signals are delivered from the CATV network infrastructure to the subscriber premises at a CATV entry adapter, which is also commonly referred to as an entry device, terminal adapter or a drop amplifier. The entry adapter is a multi-port device which connects at an entry port to a CATV drop cable from the CATV network infrastructure and which connects at a multiplicity of other distribution ports to coaxial cables which extend throughout the subscriber premises to cable outlets. Each cable outlet is available to be connected to subscriber equipment. Typically, most homes have coaxial cables extending to cable outlets in almost every room, because different types of subscriber equipment may be used in different rooms. For example, television sets, computers and telephone sets are commonly used in many different rooms of a home or office. The multiple distribution ports of the entry adapter deliver the downstream signals to each cable outlet and conduct the upstream signals from the subscriber equipment through the entry adapter to the drop cable of the CATV infrastructure.

In addition to television sets, computers and telephones, a relatively large number of other entertainment and multimedia devices are available for use in homes. For example, a digital video recorder (DVR) is used to record broadcast programming, still photography and moving pictures in a memory medium so that the content can be replayed on a display or television set at a later time selected by the user. As another example, computer games are also played at displays or on television sets. Such computer games may be those obtained over the Internet from the CATV network or from media played on play-back devices connected to displays or television sets. As a further example, signals from a receiver of satellite-broadcast signals may be distributed for viewing or listening throughout the home. These types of devices, including the more-conventional television sets, telephone sets and devices connected to the Internet by the CATV network, are generically referred to as multimedia devices.

The desire to use multimedia devices at multiple different locations within the home or subscriber premises has led to the creation of the Multimedia over Coax Alliance (MoCA). MoCA has developed specifications for products to create an in-home entertainment network for interconnecting presently-known and future multimedia devices. A MoCA in-home network uses the subscriber premise or in-home coaxial cable infrastructure originally established for distribution of CATV signals within the subscriber premises, principally because that coaxial cable infrastructure already exists in most homes and is capable of carrying much more information than is carried in the CATV frequency bands. A MoCA network is established by connecting MoCA-enabled or MoCA interface devices at the cable outlets in the rooms of the subscriber premises. These MoCA interface devices implement a MoCA communication protocol which encapsulates the signals normally used by the multimedia devices within MoCA signal packets and then communicates the MoCA signal packets between other MoCA interface devices connected at other cable outlets. The receiving MoCA interface device removes the encapsulated multimedia signals from the MoCA signal packets, and delivers the multimedia signals to the connected display, computer or other multimedia device from which the content is presented to the user.

Each MoCA-enabled device is capable of communicating with every other MoCA-enabled device in the in-home or subscriber premises MoCA network to deliver the multimedia content throughout the home or subscriber premises. The multimedia content that is available from one multimedia device can be displayed, played or otherwise used on a different MoCA enabled device at a different location within the home, thereby avoiding physically relocating the originating multimedia device from one location to another within the subscriber premises. The communication of multimedia content over the MoCA network is considered beneficial in more fully utilizing the multimedia devices present in modern homes.

Since the operation of the subscriber premises MoCA network must occur simultaneously with the operation of the CATV services, the MoCA signals utilize a frequency range different from the frequency ranges of the CATV upstream and downstream signals. The typical MoCA frequency band is 1125-1525 MHz.

In addition to traditional cable television service, a telephone service, known as "lifeline telephone service," is also available to many CATV subscribers. Lifeline telephone service remains operative in emergency situations, even during a loss of power to the subscriber premises. An embedded multimedia terminal adapter (eMTA) device which includes a cable modem and a telephone adapter is used to receive the telephone service. The telephone service is typically implemented using a voice over Internet protocol (VOIP) communicated by the CATV upstream and downstream signals. Since the telephone service is expected to be available during a loss of power to the subscriber premises, CATV entry adapters adapted for use with an eMTA device have a passive port to which passive CATV upstream and downstream signals are conducted without amplification or other conditioning by an active electronic component. As a consequence, the loss of power at the subscriber premises does not adversely affect the communication of passive CATV signals to and from the passive port.

In addition to the passive port, CATV entry adapters typically have an active signal communication path which amplifies the CATV downstream signals and conducts them to a plurality of active ports of the CATV entry adapter. Subscriber equipment connected to the active ports typically benefits from the amplification of the CATV downstream signals. However, the loss of power to the entry adapter adversely influences the active signals conducted to and from the active ports through power-consuming components which become inoperative when power is lost. The communication of active CATV signals under power loss conditions is severely compromised or impossible.

Most eMTA devices used for passive CATV signal communication are not presently MoCA-enabled. However, MoCA-enabled eMTA devices are recognized as useful for expanding the number of multimedia devices in the MoCA network. For example, telephony multimedia devices such as auxiliary telephone sets and answering machines could interact with a MoCA-enabled eMTA device and provide telephony services throughout the subscriber premises. In order for multimedia devices to communicate with the MoCA-enabled eMTA device, the CATV entry adapter must be capable of communicating MoCA signals between the passive and active ports.

One technique to allow MoCA signal communication between the passive and active ports is to use a MoCA signal bypass path which contains a bandpass filter for MoCA signal frequencies, as is discussed in the above-referenced previous patent application. Such a MoCA signal bypass path is essentially parallel with an active signal communication path which communicates the active CATV upstream and downstream signals between the active ports and the CATV network. However, including the MoCA bandpass filter in the MoCA bypass path in parallel with the active CATV signal communication paths has an effect on the other parallel signal paths. The filters of each path cause changes in the frequency response characteristics of the other parallel path filters. As a result of these effects, additional and time-consuming tuning of the filters in the parallel signal communication paths is required to achieve the desired frequency response. In some cases, more extensive, complex and costly filters must be used in the parallel filter paths. The additional tuning and increased complexity of the filters increases the costs of the entry adapter. The requirement for precise tuning and the added complexity increases the risk of failure or the risk of deterioration in the quality of service experienced by the customer. Such risks also increase the frequency of service calls made by the CATV service provider, and such service calls are a significant expense to the service provider.

SUMMARY OF THE INVENTION

The present invention is for a CATV entry adapter which beneficially connects a subscriber premises to a CATV network and which contributes to the establishment of a MoCA in-home network. The CATV entry adapter of the present invention effectively communicates MoCA signals between a passive port and active ports of the CATV entry adapter through a MoCA signal bypass path. The MoCA signal bypass path comprises a pair of directional couplers. Use of the directional couplers avoids the frequency tuning related cost and complexity of adding a MoCA signal frequency specific signal communication path in parallel to frequency-specific CATV upstream and downstream signal communication paths. The MoCA signal bypass path and the directional couplers expand the MoCA network to include both the active and passive ports without adversely affecting the CATV signals conducted through the CATV entry adapter.

In accordance with these features one aspect of the invention may be summarized as a cable television (CATV) entry adapter has an entry port, a passive port and a plurality of active ports for communicating CATV signals between a CATV network and subscriber equipment and also communicating MoCA signals between the MoCA-enabled subscriber equipment connected to the passive and active ports in a subscriber premises MoCA network. The CATV entry adapter comprises first and second splitters each having a common terminal and separate signal component legs. The common terminal of the first splitter is operatively connected to the entry port. The separate legs of the second splitter are connected individually to the active ports. An active-side directional coupler is operatively connected between the common terminal of the second splitter and one of the separate legs of the first splitter. A passive-side directional coupler is operatively connected between the passive port and another of the separate legs of the first splitter. Coupled ports of the directional couplers are connected together to communicate MoCA signals between the passive and active ports.

Further in accordance with the above features, another aspect of the invention may be summarized as a method of using a cable television (CATV) entry adapter having an entry port, a passive port and a plurality of active ports to communicate CATV signals with a CATV network connected to the entry port and subscriber devices connected to the passive and active ports while simultaneously communicating MoCA signals between MoCA-enabled multimedia devices in a MoCA network connected at the passive and active ports. The method comprises conducting CATV signals to and from the CATV network at the entry port, conducting passive CATV signals through a main leg of a passive-side directional coupler operatively connected between the entry port and the passive port, conducting active CATV signals through a main leg of an active-side directional coupler operatively connected between the entry port and the plurality of active ports, and conducting MoCA signals between the passive and active ports through connected directional legs of the passive-side and active-side directional couplers. The method may also include preventing the conduction of MoCA signals from within the CATV entry device onto the CATV network.

Other and different statements and aspects of the invention appear in the following claims. A more complete appreciation of the present invention, as well as the manner in which the present invention achieves the above and other improvements, can be obtained by reference to the following detailed description of a presently preferred embodiment taken in connection with the accompanying drawings, which are briefly summarized below, and by reference to the appended claims.

DETAILED DESCRIPTION

Figure 1:
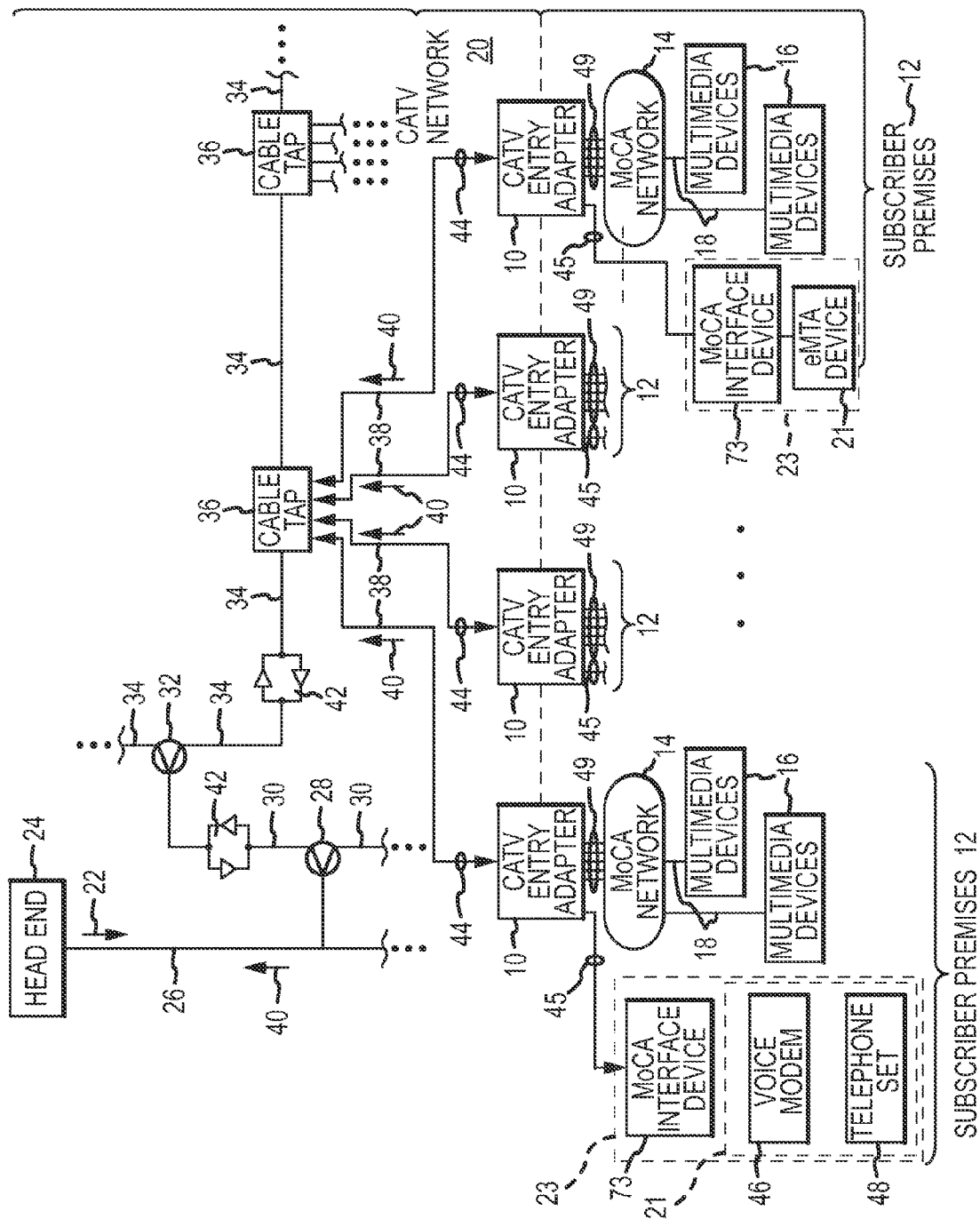
FIG. 1 is a block diagram illustrating a plurality of CATV entry adapters which incorporate the present invention, shown interconnecting a CATV network and a plurality of MoCA in-home networks each located at subscriber premises.

A community access or cable television (CATV) entry adapter 10 which incorporates the present invention is shown generally in FIG. 1. The CATV entry adapter 10 is located at or in a CATV subscriber's premises 12 and forms a part of a conventional MoCA in-home entertainment network 14. Multimedia devices 16 are interconnected by the MoCA network 14 in the subscriber premises 12. The multimedia devices 16 communicate multimedia content or MoCA signals between one another using the MoCA network 14. The MoCA network 14 is formed in part by the preexisting coaxial cable infrastructure (represented generally by coaxial cables 18) present in the subscriber premises 12. Examples of multimedia devices 16 are digital video recorders, computers, data modems, computer game playing devices, television sets, television set-top boxes, certain telephony equipment such as auxiliary phones and automated answering machines, and other audio and visual entertainment devices, among other things. In general, the multimedia devices 16 constitute active subscriber equipment.

The CATV entry adapter 10 is also a part of a conventional CATV network 20. The CATV entry adapter delivers CATV content or signals from the CATV network 20 to subscriber equipment at the subscriber premises 12. In addition to the multimedia devices 16, the subscriber equipment may also include other devices which do not operate as part of the MoCA network 14 but which are intended to function as a result of connection to the CATV network 20. Examples of subscriber equipment which are normally not part of the MoCA network 14 are eMTA devices 21 which are exemplified by a voice modem 46 and connected telephone set 48.

The subscriber equipment and the eMTA device 21 receive CATV downstream signals from the CATV network 20, and the subscriber equipment and the eMTA device 21 send CATV upstream signals to the CATV network. The CATV upstream and downstream signals communicated between the CATV network 20 and the eMTA device 21 are passive CATV signals. The CATV upstream and downstream signals sent to and received by the CATV network 20 by the other subscriber equipment are active CATV signals. A MoCA-enabled eMTA device 23 also communicates MoCA signals with the MoCA network 14. A MoCA-enabled eMTA device 23 includes a conventional eMTA device 21 and a MoCA interface device 73. The MoCA interface device 73 permits communication of MoCA signals among all MoCA-enabled multimedia devices 16.

The CATV entry adapter 10 has beneficial characteristics which allow it to function in multiple roles simultaneously in both the MoCA network 14 and in the CATV network 20, thereby benefitting both the MoCA network 14 and the CATV network 20. The CATV entry adapter 10 functions as a hub in the MoCA network 14, to effectively transfer or distribute MoCA signals between the multimedia devices 16 and the eMTA interface device 73. In this manner, the CATV entry adapter 10 effectively communicates MoCA signals between the MoCA-enabled eMTA device 23 and the multimedia devices 16, thereby distributing the functionality of the eMTA device 23 to the multimedia devices 16 throughout the subscriber premises. The CATV entry adapter 10 also functions in a conventional role as an interface between the CATV network 20 and the subscriber equipment located at the subscriber premises, communicating CATV signals between the subscriber equipment and the CATV network 20. These and other improvements and functions are described in greater detail below.

The CATV network 20 shown in FIG. 1 has a typical topology. Downstream CATV signals 22 originate from programming sources at a headend 24 of the CATV network 20, and are conducted to the CATV entry adapter 10 in a sequential path through a main trunk cable 26, a signal splitter/combiner 28, secondary trunk cables 30, another signal splitter/combiner 32, distribution cable branches 34, cable taps 36, and drop cables 38. Upstream signals 40 are delivered from the CATV entry adapter 10 to the CATV network 20, and are conducted to the headend 24 in a reverse sequence. Interspersed at appropriate locations within the topology of the CATV network 20 are conventional repeater amplifiers 42, which amplify both the downstream signals 22 and the upstream signals 40. Conventional repeater amplifiers may also be included in the cable taps 36. The cable taps 36 and signal splitter/combiners 28 and 32 divide a single downstream signal into multiple separate downstream signals, and combine multiple upstream signals into a single upstream signal.

The CATV entry adapter 10 receives the downstream signals 22 from the CATV network 20 at a CATV network connection or entry port 44. Passive downstream signals are conducted through the CATV entry adapter 10 to the eMTA device 21 without amplification, enhancement, modification or other substantial conditioning. Passive downstream signals are delivered from a passive port 45 to passive subscriber equipment, i.e. the eMTA device 21 represented by the voice modem 46 connected to the telephone set 48 through the MoCA-enabled eMTA device 23.

Active downstream signals are amplified, filtered, modified, enhanced or otherwise conditioned by power-consuming active electronic circuit components within the CATV entry adapter 10, such as an amplifier, for example. The active downstream signals are divided into multiple copies, and a copy is delivered from each of a plurality of active ports, collectively referenced at 49 (but individually referenced at 50, 52, 54 and 56 in FIG. 2). The active downstream signals are delivered to active subscriber equipment located at the subscriber premises 12.

Typically, the active subscriber equipment will be the multimedia devices 16 connected as part of the MoCA network 14. However, an active subscriber device does not have to be MoCA-enabled. An example of a non-MoCA-enabled active subscriber device is a television set directly connected to an active port of the CATV entry adapter without the use of a MoCA interface. In this example, the non-MoCA-enabled television set would not be a part of the MoCA network 14.

The CATV subscriber equipment typically generates upstream signals 40 (FIG. 2) and delivers them to the CATV entry adapter 10 for delivery to the CATV network 20. The upstream signals 40 may be passive upstream signals generated by the eMTA device 21, or the upstream signals 40 may be active upstream signals generated by active subscriber equipment or multimedia devices 16, as exemplified by set-top boxes connected to television sets (neither shown). Set top boxes allow the subscriber/viewer to make programming and viewing selections.

Figure 2:
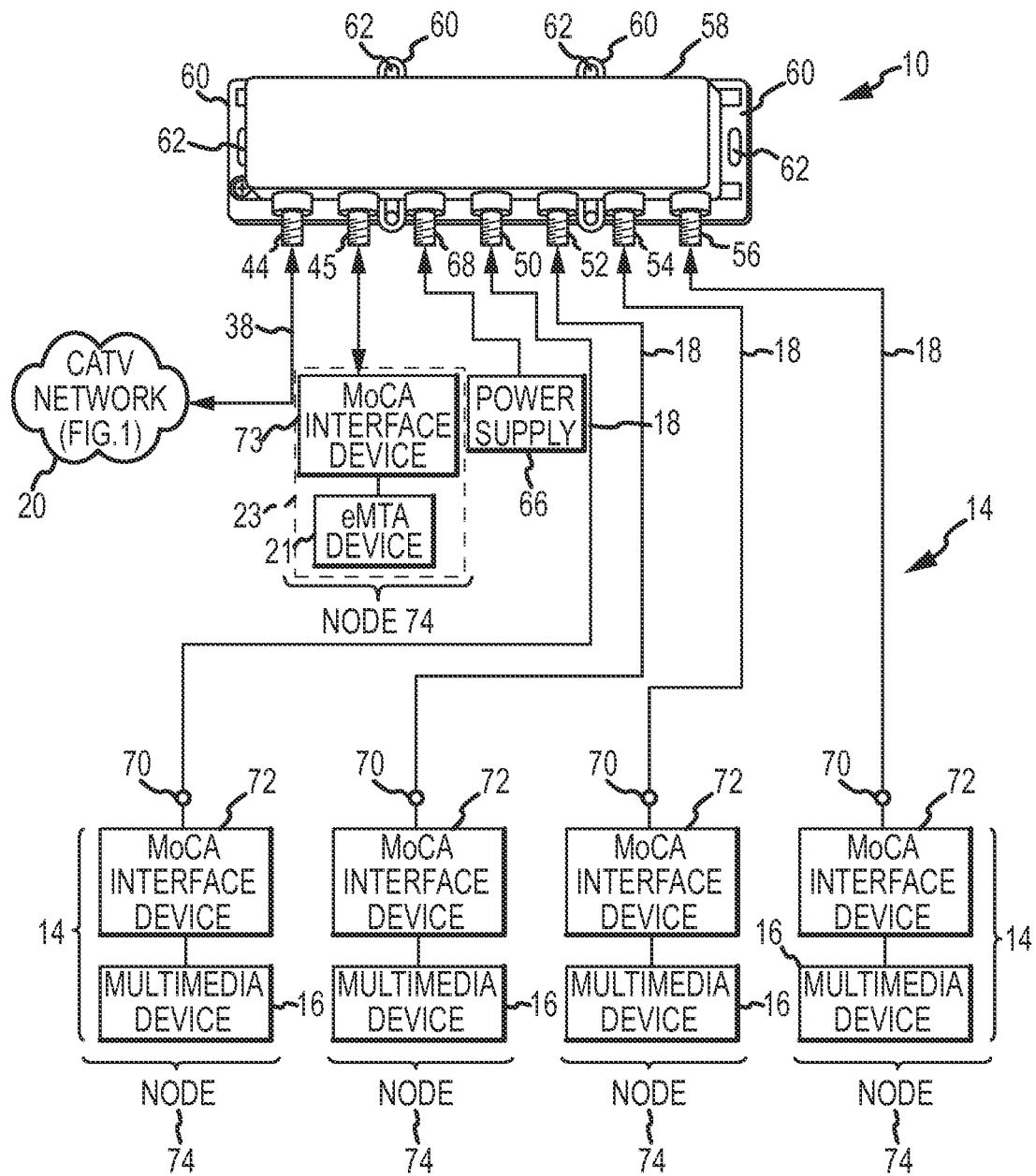
FIG. 2 is a generalized perspective view of one CATV entry adapter shown in FIG. 1, connected to the MoCA network in one subscriber premises, with more details of the MoCA network and active and passive subscriber equipment connected to the CATV entry adapter shown in block diagram form.

More details concerning the CATV entry device are shown in FIG. 2. The CATV entry adapter 10 includes a housing 58 which encloses internal electronic circuit components (shown in FIG. 3). A mounting flange 60 surrounds the housing 58 and holes 62 in the flange 60 allow attachment of the CATV entry adapter 10 to a support structure at the subscriber premises. Electrical power for the active components of the CATV entry adapter 10 is supplied from a conventional DC power supply 66 connected to a dedicated power input port 68. Alternatively, electrical power can be supplied through a conventional power inserter (not shown) that is connected to one of the active ports 50, 52, 54 or 56. The power inserter allows relatively low voltage DC power to be conducted through the same active port that also conducts high-frequency signals. Use of a conventional power inserter eliminates the need for a separate dedicated power supply port 68, or provides an alternative port through which electrical power can also be applied. The power supply 66 or the power supplied from the power inserter is typically derived from a conventional wall outlet (not shown) within the subscriber premises. The CATV network 20 is connected to the CATV network connection entry port 44 of the CATV entry adapter 10.

The ports 44, 45, 50, 52, 54, 56 and 68 are each preferably formed by a conventional female coaxial cable connector which is mechanically connected to the housing 58 and which is electrically connected to internal components of the CATV entry adapter 10. Coaxial cables 18 from the subscriber premises cable infrastructure and the drop cables 38 (FIG. 1) are connected to the CATV entry adapter 10 by mechanically connecting the corresponding mating male coaxial cable connectors (not shown) on these coaxial cables to the female coaxial cable connectors forming the ports 44, 45, 50, 52, 54, 56 and 68.

One CATV entry adapter 10 is located at each subscriber premises. The number of active and passive ports 45, 50, 52, 54 and 56 is dictated by the number of coaxial cables 18 which are routed throughout the subscriber premises. Although the CATV entry adapter 10 shown in FIG. 2 includes seven ports, other entry adapters may have a larger or smaller number of ports. The number and routing of the coaxial cables 18 within the subscriber premises constitute the in-home or subscriber premise cable infrastructure that is used by the MoCA network 14 (FIG. 1).

Since the CATV service provider provides the CATV entry adapter 10 for use by each CATV subscriber, it is advantageous to reduce the number of different configurations of CATV entry adapters that subscribers may require. Doing so offers economies of scale in mass production, reduces the opportunity for errors in installation, allows the subscriber to expand and change the in-home cable infrastructure, and reduces inventory costs, among other things. Incorporating functionality in the CATV entry adapter 10 to give it the capability of functioning as a hub in the MoCA network 14 (FIG. 1) also promotes economies of scale, error reduction, expansion capability, versatility and reduction in inventory cost. With the improvements described below, the CATV entry adapter 10 permits the effective use of both eMTA devices 23 and multimedia devices 16 connected in a MoCA network 14, without degrading or compromising the VOIP service supplied to the MoCA-enabled eMTA device 23.

Each of the coaxial cables 18 of the in-home cable infrastructure terminates at a cable outlet 70. Those coaxial cables 18 which are not currently in use are preferably terminated with an appropriate termination resistor (not shown) located at the cable outlet 70 of these coaxial cables 18. In most cases however, the cable outlet 70 of the coaxial cable 18 is connected to a MoCA interface device 72 to which a separate multimedia device 16 is connected.

Each MoCA interface device 72 is conventional and contains a controller (not shown) which is programmed with the necessary functionality to implement the MoCA communication protocol. Each MoCA interface device 72 is connected between the cable outlet 70 and a multimedia device 16. When the multimedia device 16 creates output signals, those output signals are encapsulated or otherwise embodied in MoCA signals created by the MoCA interface device 72, and then those MoCA signals are transmitted by one MoCA interface device 72 through the coaxial cables 18 of the in-home cable infrastructure, through the CATV entry adapter 10 acting as a MoCA network hub, and to another receiving MoCA interface device 72 in the MoCA network 14 at the subscriber premises. The receiving MoCA interface device 72 extracts the output signals that were originally encapsulated or otherwise embodied in the MoCA signals, and the receiving MoCA interface device 72 supplies those original output signals to the multimedia device 16 to which the receiving MoCA interface device 72 is attached. The receiving MoCA interface device 72 may send administrative signals back to the original transmitting MoCA interface device 72 to confirm receipt of the MoCA signals and otherwise provide information, such as signal strength. In this manner, MoCA signals which contain the multimedia content from one multimedia device 16 are communicated through the MoCA network 14 (FIG. 1) to another MoCA-enabled multimedia device 16 for use at its location. Functioning in this manner, and in terms of the conventional terminology used in the field of networks, the MoCA interface device 72 and the multimedia device 16 form one node 74 of the MoCA network 14. MoCA signals are communicated in the described manner between the different MoCA nodes 74 of the MoCA network 14.

Although the MoCA interface devices 72 are shown as separate from the multimedia devices 16, each MoCA interface device 72 is typically incorporated within or as an integral part of each MoCA-enabled multimedia device 16. However, for those multimedia devices 16 which do not include a built-in MoCA interface device 72, a separate MoCA-enabled device 72 is connected to the multimedia device 16 to thereby allow it to participate as a node in the MoCA network 14.

The eMTA device 21 also participates in the MoCA network 14 due to the connection of the eMTA device 21 to a MoCA interface device 73. The combination of the eMTA device 21 and the connected MoCA interface device 73 constitutes the MoCA-enabled eMTA device 23. The MoCA interface device 73 may be an integral part of the eMTA device 23. The MoCA interface device 73 is similar to the MoCA interface devices 72 in communicating MoCA signals, but the MoCA interface device 73 has the additional functional capability of communicating passive CATV signals to and from the eMTA device when no electrical power is available to the MoCA interface device 73.

Figure 3:
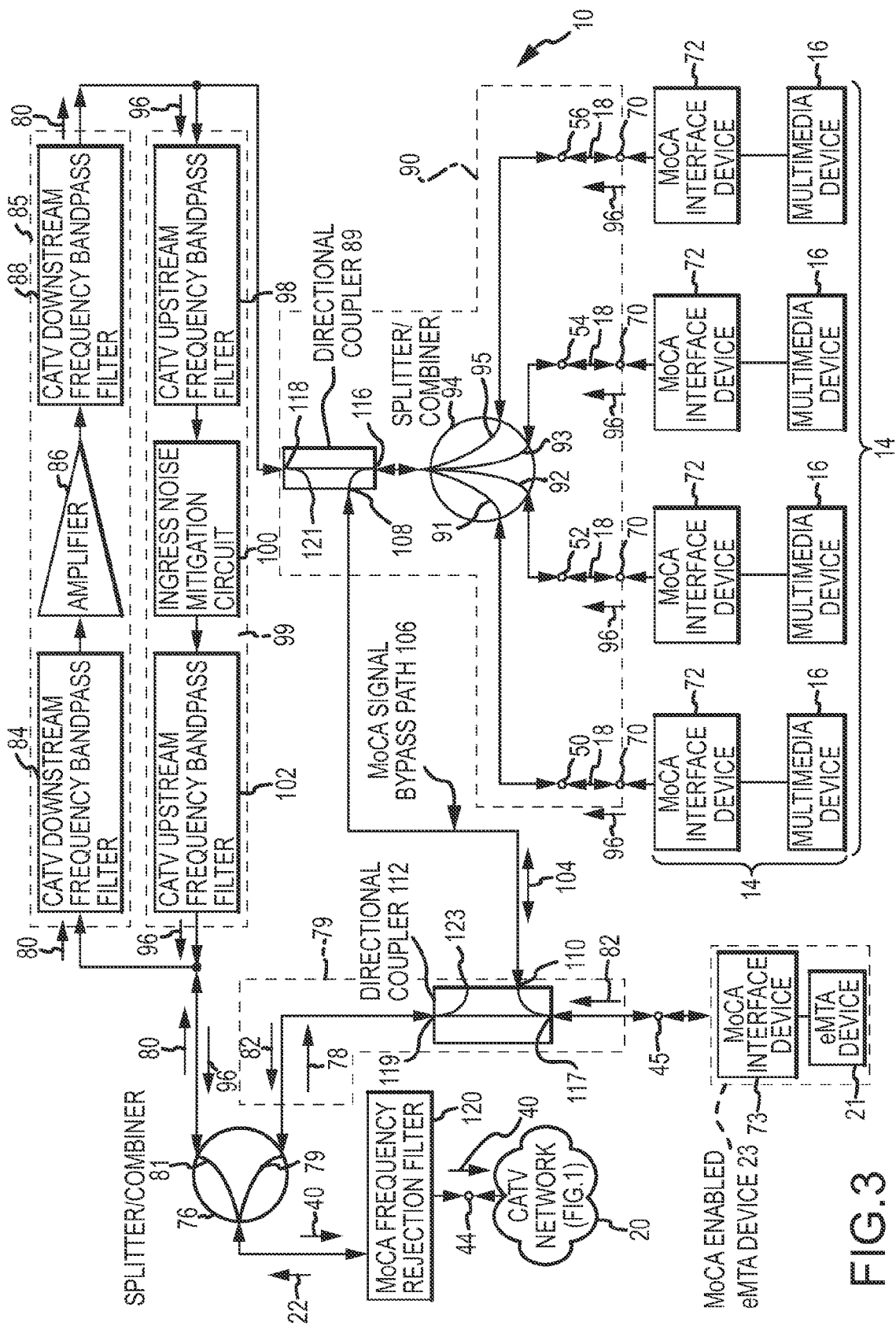
FIG. 3 is a block diagram of functional components of the CATV entry adapter shown in FIG. 2, shown connected to the CATV network, and also showing components forming nodes of the MoCA network.

The internal functional components of the CATV entry adapter 10 are shown in FIG. 3. Those internal circuit components include a first conventional bi-directional signal splitter/combiner 76 which splits the downstream signals 22 from the CATV network 20 received at a common terminal from the entry port 44. The downstream signals 22 are split into passive CATV downstream signals 78 at one separate signal component leg 79 and into active CATV downstream signals 80 at another separate signal component leg 81. The passive CATV downstream signals 78 are conducted in a CATV passive signal communication path 79 to and through the passive port 45, through the MoCA interface device 73 and to the eMTA device 21. Passive CATV upstream signals 82 are created by the eMTA device 21 and are conducted through the MoCA interface device 73, the passive port 45 and the CATV passive signal communication path 79 to the signal splitter/combiner 76 to become CATV upstream signals 40 in the CATV network 20. The CATV passive signal communication path 79 for the passive signals in the CATV entry adapter 10 contains no power-consuming active electronic components that might fail or malfunction, thereby enhancing the reliability of CATV passive communications. The CATV passive signal communication path 79 is intended to be as reliable as possible since it is used in emergency and critical circumstances.

The active CATV downstream signals 80 from the other separate signal component leg 81 of the splitter/combiner 76 are conducted to a first CATV downstream frequency bandpass filter 84 in a CATV active downstream signal communication path 85. The downstream filter 84 passes signals having frequencies in the CATV downstream frequency range of 54-1002 MHz, and rejects signals having frequencies in other ranges. The downstream signals passed by the filter 84 are amplified by an amplifier 86 and then supplied to a second CATV downstream frequency bandpass filter 88, both of which are also part of the CATV active downstream signal communication path 85.

The amplified and further filtered active CATV downstream signals are then conducted through an active-side directional coupler 89 which forms part of a combined signal communication path 90. The CATV downstream signals are conducted through the active-side directional coupler 89 to a common terminal of a second conventional bidirectional splitter/combiner 94 which also forms part of the combined signal communication path 90. The splitter/combiner 94 splits or divides those signals into four identical CATV downstream signals, each of which has approximately one-fourth of the power or signal strength of the CATV downstream signal initially applied to the splitter/combiner 94. Each of the split signals is delivered from one of four separate signal component legs 91, 92, 93 and 95 of the splitter/combiner 94. The four split signals from the signal component legs 91, 92, 93 and 95 of the splitter/combiner 94 are applied at the active ports 50, 52, 54 and 56 of the CATV entry adapter 10, respectively. Although four active ports 50, 52, 54 and 56 are shown, more active ports are achieved by use of a splitter/combiner with a different number of signal component legs, or by use of multiple cascaded splitters/combiners, to derive the desired number of split signals to be applied to all of the active ports of the entry adapter 10.

To the extent that the multimedia devices 16 connected through the coaxial cables 18 to the active ports respond to the CATV downstream signals available at the active ports 50, 52, 54 and 56, each MoCA interface device 72 passes those downstream signals directly to the multimedia device 16. The MoCA interface device 72 does not modify or otherwise influence CATV downstream signals passing through it. In those cases where the multimedia device 16 is capable of sending CATV upstream signals 96, those CATV upstream signals 96 are likewise passed through the MoCA interface device 72 without change or influence and are then conducted through the cable outlet 70, the coaxial cable 18 and the active ports 50, 52, 54 or 56 to the splitter/combiner 94. The splitter/combiner 94 combines all CATV upstream signals 96 and supplies those signals as combined active upstream signals 96 to the active-side directional coupler 89.

The CATV upstream signals 96 from the active-side directional coupler 89 are supplied to a first CATV upstream frequency bandpass filter 98, which forms a part of a CATV active upstream signal communication path 99. The filter 98 passes signals having frequencies in the CATV upstream frequency range of 5-42 MHz, and rejects signals having frequencies in other ranges. The CATV upstream signals passed by the filter 98 are then supplied to an ingress noise mitigation circuit 100. The ingress noise mitigation circuit 100 suppresses ingress noise in the range of 0-42 MHz that may have originated from noise sources within the subscriber premises. Use of the ingress noise mitigation circuit 100 is optional in the CATV entry adapter 10, but if employed, the noise mitigation circuit 100 is preferably employed in the form described in U.S. patent application Ser. No. 12/250,227, filed Oct. 13, 2008, and titled Ingress Noise Inhibiting Network Interface Device and Method for Cable Television Networks, which is assigned to the assignee hereof.

The CATV upstream signals leaving the ingress noise mitigation circuit 100 are then applied to a second CATV upstream frequency bandpass filter 102. The second CATV upstream frequency bandpass filter 102 is also optional for use. The second upstream bandpass filter 102 may not be necessary if the first upstream bandpass filter 98 provides sufficient frequency filtering characteristics and the ingress noise mitigation circuit 100 is not used. The second upstream bandpass filter 102 may also be eliminated under certain circumstances, even when the ingress noise mitigation circuit 100 is used. The ingress noise mitigation circuit 100 and the second CATV upstream bandpass filter 102 are also part of the CATV active upstream signal communication path 99.

The active upstream signals from the CATV active upstream signal communication path 99 are supplied to the signal component leg 81 of the splitter/combiner 76. The passive upstream signals 82 from the CATV passive signal communication path 79 are supplied to the signal component leg 79 of the splitter/combiner 76. The splitter/combiner 76 combines the signals supplied to its signal component legs and 79 and 81 to form a single combined upstream signal 40 which is supplied through the entry port 44 to the CATV network 20.

When the CATV entry adapter 10 is used as a hub in the MoCA network 14 (FIG. 1), and non-MoCA-enabled subscriber equipment (not shown) is connected to the only passive port 45 of that entry adapter 10, the MoCA network 14 exists only between and through the active ports 50, 52, 54 and 56. MoCA signals 104 from the MoCA interface devices 72 are communicated through the cable outlets 70, the coaxial cables 18, the active ports 50, 52, 54 and 56, and the splitter 94. Splitter 94 has a conventional construction with relatively low isolation between all of its signal component legs 91, 92, 93 and 95 in the MoCA signal frequency band to facilitate MoCA signal communication between its signal component legs of 91, 92, 93 and 95. In this manner, the splitter 94 conducts the MoCA signals 104 to all of the coaxial cables 18 connected to the entry adapter to achieve MoCA signal communication among all of the MoCA interface devices 72.

Attaching non-MoCA-enabled eMTA subscriber equipment to the passive port 45 deprives the subscriber of the benefits of using the passive port 45 as part of the MoCA network 14 (FIG. 1). Connecting MoCA-enabled subscriber equipment, such as the MoCA-enabled eMTA device 23, to the passive port 45, allows the MoCA-enabled eMTA device 23 to participate in the MoCA network 14. When the MoCA-enabled eMTA device 23 is connected to the passive port 45, the subscriber obtains the capability to distribute the telephony and other services to other multimedia devices 16 in the MoCA network 14. Exemplary multimedia devices 16 which may receive the distributed telephone service include auxiliary telephones and answering machines, among other devices.

When MoCA-enabled passive subscriber equipment, such as the MoCA-enabled eMTA device 23, is connected to the passive port 45, the MoCA network 14 includes the passive port 45 and the active ports 50, 52, 54 and 56. MoCA signals are not conducted through the CATV active upstream and downstream signal communication paths 99 and 85 because the filters 84, 88, 98 and 102 severely attenuate the MoCA signals in the 1125-1525 MHZ frequency range. Moreover, attempting to conduct the MoCA signals in the reverse direction through the amplifier 86 results in severe attenuation of those signals, if such conduction is even possible. A similar result applies when attempting to conduct MoCA signals through the ingress noise mitigation circuit 100.

To permit the CATV entry adapter 10 to communicate MoCA signals 104 from the passive port 45 to the active ports 50, 52, 54 and 56, a MoCA signal bypass path 106 is established between the CATV passive signal communication path 79 and the combined signal communication path 90. The MoCA signal bypass path 106 includes the active-side directional coupler 89 and a passive-side directional coupler 112. The MoCA signal bypass path 106 extends between a coupled port 108 of the active-side directional coupler 89 and a coupled port 110 of the passive-side directional coupler 112. Arranged in this manner, the passive-side directional coupler 112 is part of the CATV passive signal communication path 79, and the active-side directional coupler 89 is part of the combined signal communication path 90. The MoCA signal bypass path 106 also connects to the CATV active signal communication paths 85 and 99.

The directional couplers 89 and 112 are of conventional construction, and each has four ports: coupled ports 108 and 110; input ports 116 and 117, through ports 118 and 119; and isolated ports 121 and 123, respectively. The isolated ports 121 and 123 are terminated in their appropriate characteristic impedance (not shown) in the entry adapter 10. The conventional functionality of each coupler 89 and 112 causes the majority of power incident at the input ports 116 and 117 to flow through the directional couplers to the through ports 118 and 119, with a residual amount of the input power flowing to the coupled ports 108 and 110. Substantially none of the power incident at the input ports 116 and 117 is coupled to the isolated ports 121 and 123. In addition, power incident to the coupled port will flow to the input port and will be isolated from the through port. In this manner, MoCA signals from the MoCA interface devices 72 and 73 are readily conducted through the coupled ports 108 and 110 and through the MoCA signal bypass path 106, thereby assuring relatively strong MoCA signal communication between the MoCA enabled devices connected to the ports 45 and 70.

The conventional functionality of each coupler and 89 and 112 causes the majority of power incident at the through ports 118 and 119 to flow to the input ports 116 and 117. Substantially none of the power incident at the through ports 118 and 119 is coupled to the coupled ports 108 and 110. The amount of the incident power applied at the input ports 116 and 117 which flows to the coupled ports 108 and 110 is established by the coupling factor associated with each directional coupler. The extent of the power rejected at the isolated ports is established by a rejection factor associated with each directional coupler. The coupling and rejection factors also apply respectively to the coupling and isolation of incident power at the through ports 118 and 119 with respect to the isolated ports 121 and 123 and the coupled ports 108 and 110.

Signal paths through the directional couplers 89 and 112 from the input ports 116 and 117 to the through ports 118 and 119, respectively, are referred to herein as "main legs." Signals passing in either direction through the main legs incur a small amount of signal attenuation, preferably less than one or two decibels (dB), as described above. Signal paths through the directional couplers 89 and 112 from the input ports 116 and 117 to the coupled ports 108 and 110 are referred to herein as "directional legs." Signals passing in either direction through the directional legs incur a modest amount of signal attenuation of around 10 to 20 dB, as described above. Signals are substantially prevented from passing between the through ports 118 and 119 and the coupled ports 108 and 110, respectively, due to the normal functionality of the directional couplers 89 and 112, as described above.

The input ports 116 and 117 of the directional couplers 89 and 112 are connected to the common terminal of the splitter 94 and the passive port 45, respectively. The through port 118 of the directional coupler 89 is operatively connected to the second leg 81 of the splitter/combiner 76 through the CATV active downstream and upstream signal communication paths 85 and 99. The through port 119 of the directional coupler 112 is operatively connected to the first leg 79 of the splitter/combiner 76. The small amount of signal attenuation which the CATV signals incur passing through the main legs of the directional couplers 89 and 112 does not impact the functionality of the MoCA-enabled eMTA device 23 or the other subscriber equipment which may be connected to the active ports of the CATV entry adapter 10.

MoCA signals 104 which originate from the MoCA interface device 73 are communicated to the MoCA interface devices 72 by passing through the MoCA signal bypass path 106, i.e. through the passive port 45, the input port 117 of the passive-side directional coupler 112, the directional leg and coupled port 110 of the passive-side directional coupler 112, the MoCA signal bypass path 106, the coupled port 108 and directional leg of the active-side directional coupler 89, and the input port 116 of the active-side directional coupler 112. The signals are then conducted through the splitter 94, and the active ports 50, 52, 54 and 56 to the MoCA interface devices 72.

Similarly, MoCA signals 104 which originate from the MoCA interface devices 72 are communicated to the MoCA interface device 73. These MoCA signals 104 pass through the splitter 94, the input port 116 of the active-side directional coupler 89, the coupled port 108 and directional leg of the active-side directional coupler 89, the MoCA signal bypass path 106, the coupled port 110 and directional leg of the passive-side directional coupler 112, and the input port 117 of the passive-side directional coupler 112, and the passive port 45. In this manner, the MoCA-enabled eMTA device 23 communicates with the MoCA interface devices 72 and the multimedia devices 16 within the MoCA network 14.

Since the directional couplers 89 and 112 are not frequency suppressive, CATV upstream signals 82 and 96 as well as MoCA signals 104 are conducted through the MoCA signal bypass path 106. However, any CATV upstream signals which are communicated through the MoCA signal bypass path 106 are ignored by the MoCA-enabled eMTA device 23 or MoCA interface devices 72 and 73 which receive them.

The use of the directional couplers 89 and 112 to establish the MoCA signal bypass path 106 within the CATV entry adapter 10 is beneficial in several important regards. Since the MoCA signal bypass path 106 does not contain a frequency filter, the problems of tuning a third frequency filter in parallel with the two active downstream and upstream signal communication paths 85 and 99 is avoided. Using only two parallel frequency specific signal communication paths 85 and 99 greatly simplifies the tuning of the bandpass filters in those signal communication paths compared to the complexity of tuning filters in three parallel frequency-specific signal communication paths. The directional couplers 89 and 112 do not require power to operate, thereby allowing the MoCA-enabled eMTA device 23 to communicate with the CATV network 20 in situations where power to the CATV entry adapter 10 is interrupted. The directional couplers 89 and 112 are readily available components which simplify the manufacturing of the CATV entry adapter 10.

The MoCA signal bypass path 106 and the directional couplers 89 and 112 effectively extend the MoCA network 14 to include MoCA compatible devices connected to the passive port 45, in addition to those connected to the active ports 50, 52, 54 and 56. The inclusion of the passive port 45 within the MoCA network 14 enables a MoCA compatible device connected to the passive port 45, such as the MoCA-enabled eMTA device 23, to communicate with multimedia devices 16 within the MoCA network 14. Multimedia devices 16 which may beneficially communicate with the MoCA-enabled eMTA device 23 include auxiliary phones and automated answering machines, among other multimedia devices.

The CATV entry adapter 10 also includes a MoCA frequency rejection filter 120 connected between the splitter/combiner 76 and the CATV network entry port 44. The MoCA frequency rejection filter 120 prevents MoCA signals from passing from the entry adapter 10 into the CATV network 20, but allows the CATV signals to pass without significant impairment. The MoCA frequency rejection filter 120 absorbs the energy of MoCA signals, thereby preventing the MoCA signals from reaching the CATV network 20. The MoCA frequency rejection filter 120 also prevents the MoCA signals from the MoCA network 14 (FIG. 1) from being received at an adjacent subscriber premises. Without the MoCA frequency rejection filter 120, as is understood from FIG. 1, the MoCA signals from one CATV entry adapter 10 could traverse the drop cables 38 to the cable tap 36, and from the cable tap through another drop cable 38 of that cable tap 36 to an adjacent CATV entry adapter 10. The MoCA frequency rejection filter 120 prevents this from happening, thereby protecting the security and privacy of the MoCA signals within the MoCA network 14 in each subscriber premises. The MoCA frequency rejection filter 120 also prevents the MoCA signals from an adjacent subscriber premise from adversely influencing or deteriorating the quality of the MoCA signals in an adjacent MoCA network connected to a cable tap 36 (FIG. 1).

The CATV entry adapter 10 beneficially contributes to the quality of service available from the CATV network 20 and from the MoCA network 14. The CATV entry adapter 10 is fully functional as a MoCA network hub to communicate adequate strength MoCA signals between all MoCA interface devices and multimedia devices, while simultaneously preserving the intended CATV functionality. The MoCA frequency rejection filter 120 avoids compromising the privacy and security of the MoCA content which is expected to be maintained only within the MoCA network of each subscriber's premises. The advantageous functionality of the CATV entry adapter is obtained within the housing of the CATV entry adapter, thereby shielding that desirable functionality from unauthorized tampering, negligence in installation, and physical exposure. The multi-functional aspects of the CATV entry adapter allow it to be used in many situations, thereby increasing its economies of scale and use and facilitating greater convenience in installation by the CATV service provider. The CATV entry adapter 10 allows subscribers more flexibility in expanding and changing both their CATV subscriber equipment and their MoCA network and multimedia devices.

The significance of these and other improvements and advantages will become apparent upon gaining a full appreciation of the present invention. A preferred embodiment of the invention and many of its improvements have been described above with a degree of particularity. The detailed description is of a preferred example of implementing the invention. The details of the description are not necessarily intended to limit the scope of the invention. The scope of the invention is defined by the following claims.

The invention claimed is:

1. A cable television (CATV) entry adapter having an entry port, a passive port and a plurality of active ports for communicating CATV signals between a CATV network and subscriber equipment and also communicating Multimedia over Coax Alliance (MoCA) signals between MoCA enabled subscriber equipment connected to the passive and active ports in a subscriber premises MoCA network, the CATV entry adapter comprising:

a first bidirectional splitter/combiner, within the CATV entry adapter, having a common terminal and first and second signal component legs to communicate CATV downstream and upstream signals with the CATV network, the first splitter/combiner splitting the CATV downstream signals at its common terminal into split active and passive CATV downstream signals at each of its first and second legs corresponding and also combining active and passive CATV upstream signals at the first and second legs into a single signal at its common terminal;

a second bidirectional splitter/combiner, within the CATV entry adapter, having a common terminal and a plurality of separate signal component legs to communicate the CATV downstream and upstream signals to and from a plurality of the MoCA enabled subscriber equipment, the second splitter/combiner splitting the active CATV downstream signals at its common terminal into split active CATV downstream signals at each of its separate legs and also combining the active CATV upstream signals at its separate legs into a single signal at its common terminal;

an active-side directional coupler, within the CATV entry adapter, having a input port, a through port, a main leg between its input and through ports, a coupled port and a directional leg between its input and coupled ports to communicate the active CATV downstream and upstream signals to and from the second bidirectional splitter/combiner, wherein the active CATV downstream signals are prevented from passing between the active-side directional coupler through port and the active-side directional coupler coupled port;

a passive-side directional coupler, within the CATV entry adapter, having a input port, a through port, main leg between its input and through ports, a coupled port and a directional leg between its input and coupled ports to communicate the passive CATV downstream and upstream signals to and from the first bidirectional splitter/combiner, wherein the passive CATV downstream signals are prevented from passing between the passive-side directional coupler through port and the passive-side directional coupler coupled port, wherein:

the common terminal of the first bidirectional splitter/combiner is operatively connected to the entry port;

the separate signal component legs of the second bidirectional splitter/combiner are connected individually to the active ports which are connected to the plurality of the MoCA enabled subscriber equipment;

the main leg of the passive-side directional coupler is operatively connected between the passive port and the first leg of the first bidirectional splitter/combiner, wherein the passive port is connected to the MoCA enabled subscriber equipment;

the main leg of the active-side directional coupler is operatively connected between the input port of the second bidirectional splitter/combiner and the second leg of the first bidirectional splitter/combiner;

the coupled ports of the passive-side and active-side directional couplers are operatively connected together to establish a MoCA bypass path for conducting the MoCA signals between the passive and active ports through the taps legs of both directional couplers, the MoCA signals are isolated from the respective through port of each of the directional couplers; and a MoCA signal frequency resection filter, within the CATV entry adapter, connected between the common terminal of the first signal splitter/combiner and the CATV entry port to operatively prevent a conduction of the MoCA signals from passing through the first bidirectional splitter/combiner onto the CATV network, but allowing the active CATV upstream signal and the passive CATV downstream and upstream signals to pass without impairment.

2. A CATV entry adapter as defined in claim 1, wherein the operative connection between the second leg of the first bidirectional splitter/combiner and the common terminal of the second bidirectional splitter/combiner comprises an active CATV signal communication path; and the active CATV signal communication path comprises a power-consuming electronic component which conditions CATV signals conducted in the active CATV signal communication path.

3. A CATV entry adapter as defined in claim 2, wherein the active CATV signal communication path comprises an ingress noise mitigation circuit operative to suppress upstream ingress noise originating from the MoCA enabled subscriber equipment connected to the active ports.

4. A CATV entry adapter as defined in claim 2, wherein the active CATV signal communication path further comprises:

an active CATV downstream signal communication path which contains a CATV downstream signal bypass filter which blocks all signals except for the active CATV downstream signals; and an active CATV upstream signal communication path which contains a CATV upstream signal bypass filter which blocks all signals except for the active CATV upstream signals.

5. A CATV entry adapter as defined in claim 4, wherein:

the power-consuming electronic component is connected in the active CATV downstream signal communication path; and the power-consuming electronic component comprises an amplifier.

6. A CATV entry adapter as defined in claim 1, wherein signals conducted through the main legs of the directional couplers experience less signal attenuation than the signals conducted through the directional legs of the directional couplers.

7. A CATV entry adapter as defined in claim 6, wherein the main legs attenuate the signals conducted therethrough by no greater than approximately 2 dB; and the directional legs attenuate the signals conducted therethrough by at least 20 dB.

8. A method of using a cable television (CATV) entry adapter having an entry port, a passive port and a plurality of active ports to communicate CATV signals with a CATV network connected to the entry port and subscriber devices connected to the passive and active ports while simultaneously communicating Multimedia over Coax Alliance (MoCA) signals between MoCA enabled multimedia devices in a MoCA network connected at the passive and active ports, comprising:

conducting CATV upstream and downstream signals to and from the CATV network at the entry port;

conducting passive CATV downstream and upstream signals through a main leg of a passive-side directional coupler formed internal to the CATV entry adapter, operatively connected between the entry port, through a first bidirectional splitter/combiner formed internal to the CATV entry adapter, and the passive port which is connected to the MoCA enabled multimedia device;

preventing the passive CATV downstream signals from passing between a through port and a coupled port of the passive-side directional coupler;

conducting active CATV downstream and upstream signals through a main leg of an active-side directional coupler formed internal to the CATV entry adapter, operatively connected between the entry port, through the first bidirectional splitter/combiner and a second bidirectional splitter/combiner formed internal to the CATV entry adapter, and the plurality of active ports which are connected to the plurality of the MoCA enabled multimedia devices; and preventing the active CATV downstream signals from passing between a through port and a coupled port of the active-side directional coupler;

conducting the MoCA signals between the passive and active ports through a MoCA signal bypass path established by connecting together the coupled ports of the passive-side and the active-side directional couplers through both directional legs of the passive-side and active-side directional couplers, wherein the MoCA signals are isolated from the respective through port of each of the directional couplers;

preventing, by a MoCA signal frequency resection filter formed internal to the CATV entry adapter, a conduction of the MoCA signals from leaving the entry port onto the CATV network; and allowing, by a MoCA signal frequency rejection, the active CATV upstream signal and the passive CATV downstream and upstream signals to pass without impairment onto the CATV network.

9. A method as defined in claim 8, further comprising:
attenuating the signals conducted through the main legs of the directional couplers by a relatively lesser amount; and
attenuating the signals conducted through the directional legs of the directional couplers by a relatively greater amount.

10. A method as defined in claim 9, further comprising:
passing the CATV downstream and upstream signals through an active electronic component to create the active CATV downstream and upstream signals conducted between the entry port and the plurality of active ports.

11. A method as defined in claim 10, further comprising:
passing the passive CATV downstream and upstream signals between the entry port and the passive port through electronic components that do not require a supply of electrical power.

12. A method as defined in claim 8, further comprising:
passing the active CATV signals through separate signal communication paths in upstream and downstream directions between the entry port and the active-side directional coupler.

13. A cable television (CATV) entry adapter having a CATV entry port, a passive port and a plurality of active ports for communicating CATV signals between a CATV network and subscriber equipment and also communicating Multimedia Over Coax Alliance (MoCA) signals between MoCA enabled subscriber equipment connected to the passive and active ports in a subscriber premises MoCA network, the CATV entry adapter comprising:
a housing;
a MoCA signal frequency rejection filter within the housing connected to the entry port to operatively prevent a conduction of the MoCA signals from passing onto the CATV network, but allowing active CATV upstream signal and passive CATV downstream and upstream signals to pass through without impairment; and
a pair of directional couplers within the housing, each directional coupler having a main leg between its input and through ports and a directional leg between its input and coupled ports, the main leg of one directional coupler operatively connected between the MoCA signal frequency rejection filter and the passive port to communicate the passive CATV downstream and upstream signals, the main leg of the other directional coupler operatively connected between the MoCA signal frequency rejection filter and the active ports to communicate the active CATV downstream and upstream signals, and the directional legs of the pair of directional couplers are operatively connected together to establish a MoCA signal bypass path for communicating the MoCA signals between the passive and active ports,
wherein the MoCA signals incident at the coupled port of each of the pair of directional couplers are isolated from the respective through port of each of the pair of directional couplers, and the active and passive CATV downstream signals are prevented from passing between the through port and the coupled port of each respective directional coupler of the pair of directional couplers.

14. A CATV entry adapter as defined in claim 13, further comprising:
an active electronic component which amplifies or otherwise conditions the CATV signals passing through it, and which is positioned between the entry port and the active ports.

15. A CATV entry adapter as defined in claim 14, further comprising:
a CATV signal bypass filter connected in series with the active electronic component; and wherein:
the MoCA signals communicated between the passive and active ports are entirely communicated over the MoCA signal bypass path and are prevented from being communicated through the active electronic component by the CATV signal bypass filter.

16. A CATV entry adapter as defined in claim 15, wherein the MoCA signals which are communicated through the directional couplers between the passive and active ports incur a greater amount of signal attenuation than do the CATV signals which are communicated through the directional couplers between the entry port and the passive and active ports.

* * * * *